United States Patent [19]

Fennern

[11] Patent Number: 5,213,756
[45] Date of Patent: May 25, 1993

[54] BOILING WATER REACTOR WITH EXPANDED CORE DIAMETER

[75] Inventor: Larry E. Fennern, San Jose, Calif.

[73] Assignee: General Electric Company, San Jose, Calif.

[21] Appl. No.: 694,526

[22] Filed: May 1, 1991

[51] Int. Cl.⁵ .............................................. G21C 7/00
[52] U.S. Cl. .................................. 376/219; 376/370; 376/226; 376/406
[58] Field of Search ............... 376/370, 371, 406, 219, 376/226, 227

[56] References Cited

U.S. PATENT DOCUMENTS

| | | | |
|---|---|---|---|
| 3,467,578 | 9/1969 | Hornbichler et al. | 376/370 |
| 3,723,247 | 3/1973 | Leine et al. | 376/370 |
| 5,009,838 | 4/1991 | Shioyama et al. | 376/210 |
| 5,082,620 | 1/1992 | Fennern | 376/373 |

Primary Examiner—Donald P. Walsh
Assistant Examiner—Frederick H. Voss
Attorney, Agent, or Firm—Robert R. Schroeder

[57] ABSTRACT

An expanded reactor core capacity is achieved within the constraints imposed by the diametric extent of the current advanced boiling reactor (ABWR). This enhanced core capacity is achieved through the utilization of a scalloped shroud structure in conjunction with modified control rod designs. The core diameter is expanded toward the reactor vessel interior wall to establish a minimum distance therebetween representing a minimum value thereof avoiding neutron fluence induced vessel embrittlement. The control rods servicing peripheral fuel assemblies are configured having either a T-shaped blade configuration or an L-shaped blade configuration depending upon the parallel orientations of the peripheral fuel assemblies.

27 Claims, 4 Drawing Sheets

BOILING WATER REACTOR WITH EXPANDED CORE DIAMETER

BACKGROUND OF THE INVENTION

In the decade of the 1970's, criteria for nuclear power production facilities were the subject of re-evaluation by a variety of entities. During that interval, electrical load growth slowed, the accident at Three Mile Island occurred, and the development of nuclear power facilities using then existing design criteria diminished correspondingly. The power production industry then perceived a need for simpler and safer nuclear plants with reduced plant capital and operating costs and improved plant availability and reliability. By the end of that decade, an international advanced engineering team (AET) was assembled and called upon to evaluate worldwide boiling water reactor (BWR) technology and set forth the design aspects for a BWR which would combine the best of global design features and technologies. This effort established the present day basic advanced boiling water reactor (ABWR) design parameters.

Anticipated as a standard design for the decade of the 1990's, the ABWR utilizes a reactor vessel (RPV) having an internal diameter of 7.1 m and height of 21 m. Such diametric vessel sizing is currently considered to be a maximum value in consonance with the practicalities of its manufacture. Reactor maintenance and operation are improved with the ABWR through the use of internal circulation pumps in place of the external pumps of most currently operating plants. This recirculation feature eliminates piping, decreases construction time, and reduces in-service inspections. Such internal circulation pumps also serve to enhance safety by eliminating large reactor vessel nozzles and piping below the top of the core. As a result, the fuel remains covered with water even in the case of a postulated loss-of-coolant. This annular space between the RPV shroud and the vessel wall has been sized to permit positioning and servicing of the peripherally disposed internal pumps. This, in turn, has lead to a core structure with an active fuel length (AFL) of 3.81 m (about 12 feet), 872 fuel assemblies and 205 cruciform control rods, all contained within a core shroud with an inside diameter of 5.486 m. These cruciform control rods may be withdrawn by a control rod drive into and out of cylindrical guide tubes mounted within a lower plenum. Thus configured, the ABWR is intended to achieve a gross thermal power of 3926 MWt and a net electrical output of 1356 MWe and is highly regarded by the power industry.

With the establishment of initial ABWR power plants now under way, investigators in this field are contemplating improvements to the ABWR for the next decade. Designs for this next generation of the ABWR look to concerns not only for cost per kilowatt and power performance improvements, but also to achieving improved safety employing passive features with extended operator response time requirements, for example, from 30 minutes to 3 days. Such safety criteria press for a lower density core which, in turn, necessitates a larger core volume to maintain desired power output. However, the cost and manufacturing based constraints of restricted vessel diameter remain.

An enhancement of the safety aspects of plant performance also will look to improved stability of performance. One consideration for safety contemplates an all pumps stop condition (all pumps trip and rapid revolution coast down case) where forced circulation of water through the core rapidly diminishes As the core flow diminishes, the power-to-flow ratio of the system may actually increase with the possibility of the core exhibiting a thermal-hydraulic-reactivity coupled instability. Under such conditions, flow oscillation may occur within an individual fuel bundle of a fuel assembly, which, in turn, will result in oscillation of the void or steam content within the bundle and that, in turn, will result in a neutron flux oscillation, attendant power oscillation, and dampened heat flux oscillations. The latter damping occurs due to the time constant necessarily occurring between the generation of power in the fuel and increased temperatures at its clad. In the ABWR, the region of the power flow map where this condition of instability may occur is termed an "Instability Exclusion Region" and current procedure mandates automatic insertion of control rods at its location. It is, of course, desirable to eliminate this phenomenon, a task which may be accomplished by resort to lower power densities and shortened active fuel length (AFL). The latter fuel length reduction approach stems from an observation that the thermal-hydraulic instability is related to the boiling length and two phase pressure drop losses of the fuel. Stability ensues with the shortening of AFL. Notwithstanding the above proposed solutions, all must fall within the rigid constraints of maintaining the established diameter of the reactor vessel (RPV).

SUMMARY

The present invention is addressed to a power reactor which, while maintaining the reactor vessel diametric constraints and internal recirculation features of current ABWR specifications, incorporates a reactor core of expanded dimension. As a result, the designer is afforded a latitude for lower core power density while maintaining overall output power. Additionally, the designer may contemplate shortening active fuel length. These options permit reactor designs leading to enhanced stability performance with a retention of power output. Conversely, the expanded core capability may be employed to enhance power output performance.

With the improved design approach of the invention, control into the peripheral region of the expanded reactor core, otherwise restricted by the internally disposed impellers and diffusers of recirculating pumps, is maintained through the use of revised control rod blade structures. These revised structures, which may take "T" or "L" shapes, as opposed to conventional cruciform designs, are capable of providing requisite shutdown functions with respect to the peripheral fuel assemblies of the reactor core.

Another feature of the invention is to provide a power reactor including an upstanding reactor vessel having an internal surface of generally cylindrical configuration and of predetermined inner diameter. A steam treating arrangement is provided within a generally upwardly-disposed region of the vessel for providing steam-water separation, and a plurality of coolant recirculation pumps having impellers mounted within a lower portion of the reactor vessel are provided within an annulus shaped region adjacent the vessel internal surface. A reactor core exhibiting a predetermined core circumferential diameter is located within the reactor vessel and includes a predetermined number of internally and peripherally disposed fuel assemblies incorporating fuel rods of predetermined active fuel length and power density. A control rod guide assemblage, including a plurality of control rod guides is positioned within the reactor vessel adjacent the reactor core and inwardly of the annulus shaped region. A plurality of control rods, each movable from within a control rod guide to a select location intermediate adjacent fuel assemblies is provided and a shroud is positioned within the reactor vessel having a cylindrical core region portion located over the annulus shaped region, surrounding the reactor core and spaced with the core from the vessel internal surface a substantially minimum distance avoiding neutron fluence induced vessel embrittlement and providing a core region coolant return. A drive arrangement is coupled with the control rods for effecting the movement thereof.

Another feature of the invention provides a power reactor comprising an upstanding reactor vessel having an internal surface of generally cylindrical configuration and of predetermined diameter. A steam treating arrangement is situate within a generally upwardly disposed region of the vessel for providing steam-water separation. A reactor core is located within the vessel below the steam treating arrangement, extending a predetermined distance between a top and bottom, including a matrix of a predetermined number of mutually spaced, vertically oriented fuel assemblies. The matrix is provided having an outwardly positioned peripheral fuel assemblies located within a generally cylindrical core periphery of predetermined diameter. The core periphery is spaced from the vessel inner surface a select first distance to define an annulus-shaped core region coolant return. A plurality of coolant recirculation pumps having head portions mounted within the vessel below the core and disposed in a circular pattern adjacent the vessel inner surface are provided. A control rod guide assemblage including a plurality of control rod guides is located within the vessel adjacent the core bottom and extending between substantially peripherally disposed control rod guides to define a generally cylindrically shaped guide region extending inwardly from the circular pattern of recirculation pumps and spaced from the vessel inner surface a second distance greater than the first distance to define an annulus shaped pump region coolant return. A plurality of control rods, each movable from within a control rod guide to a select location intermediate adjacent fuel assemblies is provided and a drive arrangement is coupled with the control rods for effecting the movement thereof.

As another feature, the invention provides a power reactor which comprises an upstanding reactor vessel having an internal surface of generally cylindrical configuration and of inner diameter of about 7.1 m. A steam treating arrangement is positioned within a generally upwardly disposed region of the vessel for providing steam-water separation. A plurality of coolant recirculation pumps having impellers of given diametric extent are mounted within a lower portion of the reactor vessel within an annulus-shaped region of radial extent corresponding with the given diametric extent and adjacent the vessel internal surface. A reactor core having a core circumferential diameter of about 6.1 meters is located within the vessel, including a predetermined number of internally and peripherally disposed fuel assemblies and a control rod guide assemblage including a plurality of control rod guides is positioned within the vessel adjacent the reactor and inwardly of the annulus-shaped region. A drive arrangement is coupled with the control rods for effecting the movement thereof.

Other objects of the invention will, in part, be obvious and will, in part, appear hereinafter. The invention, accordingly, comprises the apparatus possessing the construction, combination of elements, and arrangement of parts which are exemplified in the following description.

For a fuller understanding of the nature and objects of the invention, reference should be had to the following detailed description taken in connection with the accompanying drawings.

BRIEF DESCRIPTION OF THE INVENTION

DETAILED DESCRIPTION OF THE INVENTION

The power reactor of the present invention provides for volume improvement for the now defined design of the advanced BWR reactor (ABWR) that heretofore designed has been seen, in and of itself, to provide the following structural and operating improvements:

1. Elimination of external recirculating piping;
2. Reduction of containment radiation level by over one-half compared to currently operating plants;
3. Over 10% excess flow capability at rated power;
4. Lower recirculation flow pumping power requirements;
5. Elimination of larger reactor pressure vessel nozzles below the reactor core top elevation;
6. Reduction of control rod drive maintenance requirements;
7. Electrically ganged control rod drive; and
8. Diverse control rod drive insertion capability.

For the instant improvements, the 7.1 meter internal diameter of the pressure vessel is retained to accommodate manufacturing constraints. However, the normal 21 meter reactor height may vary depending upon an opportunity for a reduction in active fuel length for the fuel structures. The ABWR reactor vessel or the standard design follows conventional BWR vessel design with the exception that the annular space between the reactor pressure vessel shroud and the vessel wall has been increased to permit the positioning of ten internal pumps used for recirculation flow.

Figure 1:
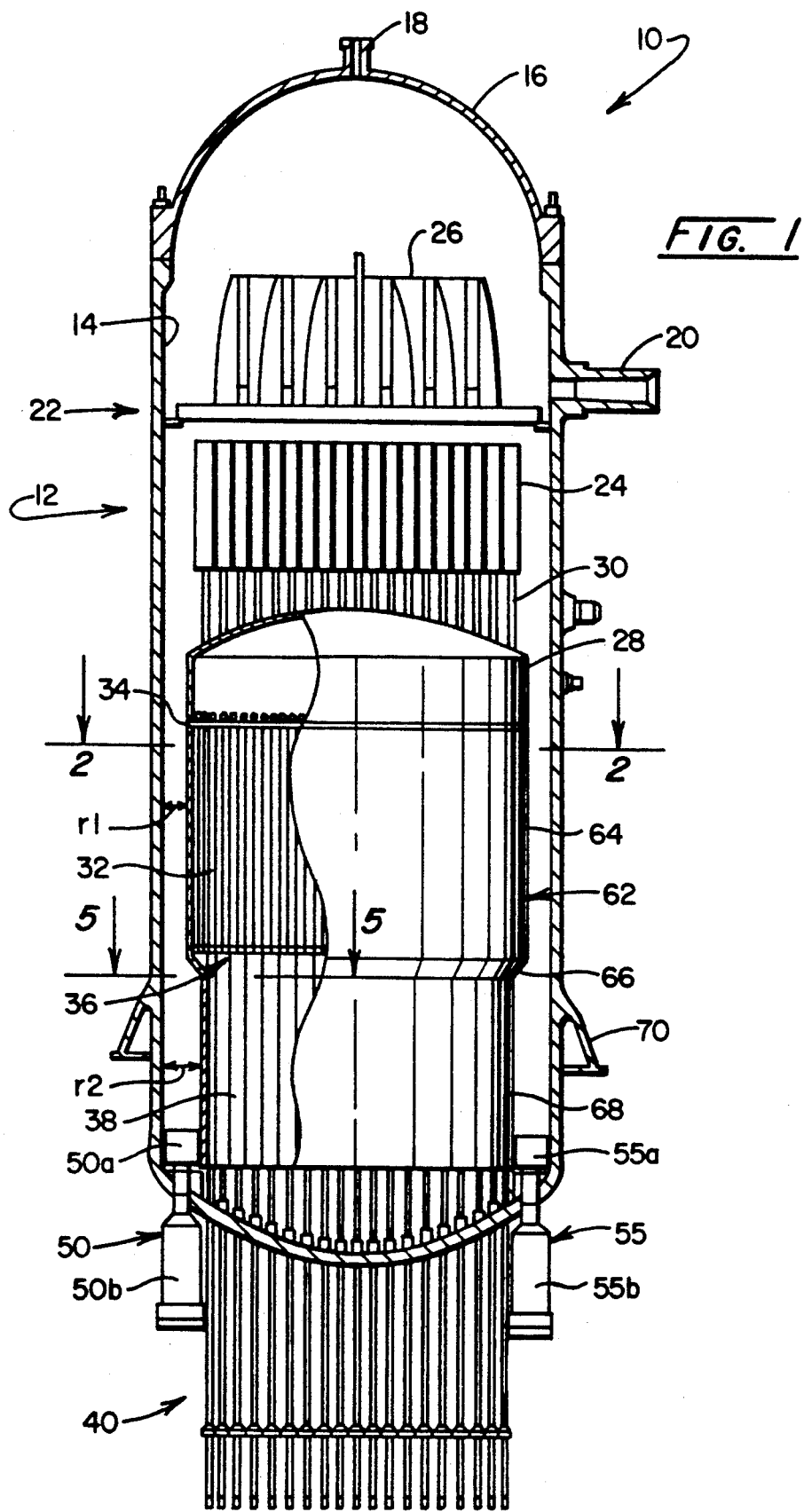
FIG. 1 is a partial sectional view of an advanced boiling water reactor assembly according to the invention with portions broken away to reveal internal structure.

Looking to FIG. 1, the advanced BWR reactor assembly as modified in accordance with the invention is revealed generally at 10. Assembly 10 includes a standardized reactor pressure vessel RPV 12 having the noted 7.1 m internal diameter at its internal surface 14. Bolted to the top surface of the cylindrical component of RPV 12 is a hemispherical dome or cap 16 at the top of which is positioned a head vent and spray 18. A steam nozzle 20 extends from the upwardly disposed steam treating region 22 of the assembly 10. Region 22 provides for steam-water separation and includes, inter alia, steam separators 24 and steam dryers 26. Next below the steam separator 24 is a plenum 28 having an apertured dome 30, the openings of which cooperate with individual components of steam separators 24. Next below the plenum 28 is the reactor core 32 which supports a matrix array of a predetermined number of mutually spaced, vertically oriented elongate fuel assemblies. Fuel assemblies within reactor 32 are retained in a vertical orientation by structuring including a circular top guide 34 and correspondingly lower disposed circular core plate 36. Immediately below the core 32 is a control rod guide assembly 38 which is formed as plurality of control rod guides, the generally outwardly disposed ones of which are referred to as peripherally disposed control rod guides which define a generally cylindrically shaped guide region of the assembly 38. Control rods (not shown) are movable within each of the control rod guides of the assembly 38 for insertion between fuel assemblies within the reactor core 32. A drive arrangement for these control rods is represented generally at 40 which will include, for example, electrical-hydraulic drives which permit a fine-motion control over their vertical movements. In the earlier defined ABWR designs, the control rods are provided having a cruciform, multi-blade structure and are movable within control rod guides which are provided as elongate tubes. The generally cylindrically shaped control rod guide region is seen to be positioned inwardly from a circular array of coolant circulating pumps or reactor internal pumps (RIP) two of the total of ten of which are seen at 50 and 55. Each of the pumps as at 50 and 55 is provided having an impeller or head portion 50a, 55a, positioned within the interior of the reactor vessel 12. Below each impeller component is a driving motor as at 50b, 55b, which is positioned outwardly of the vessel 12.

Figure 2:
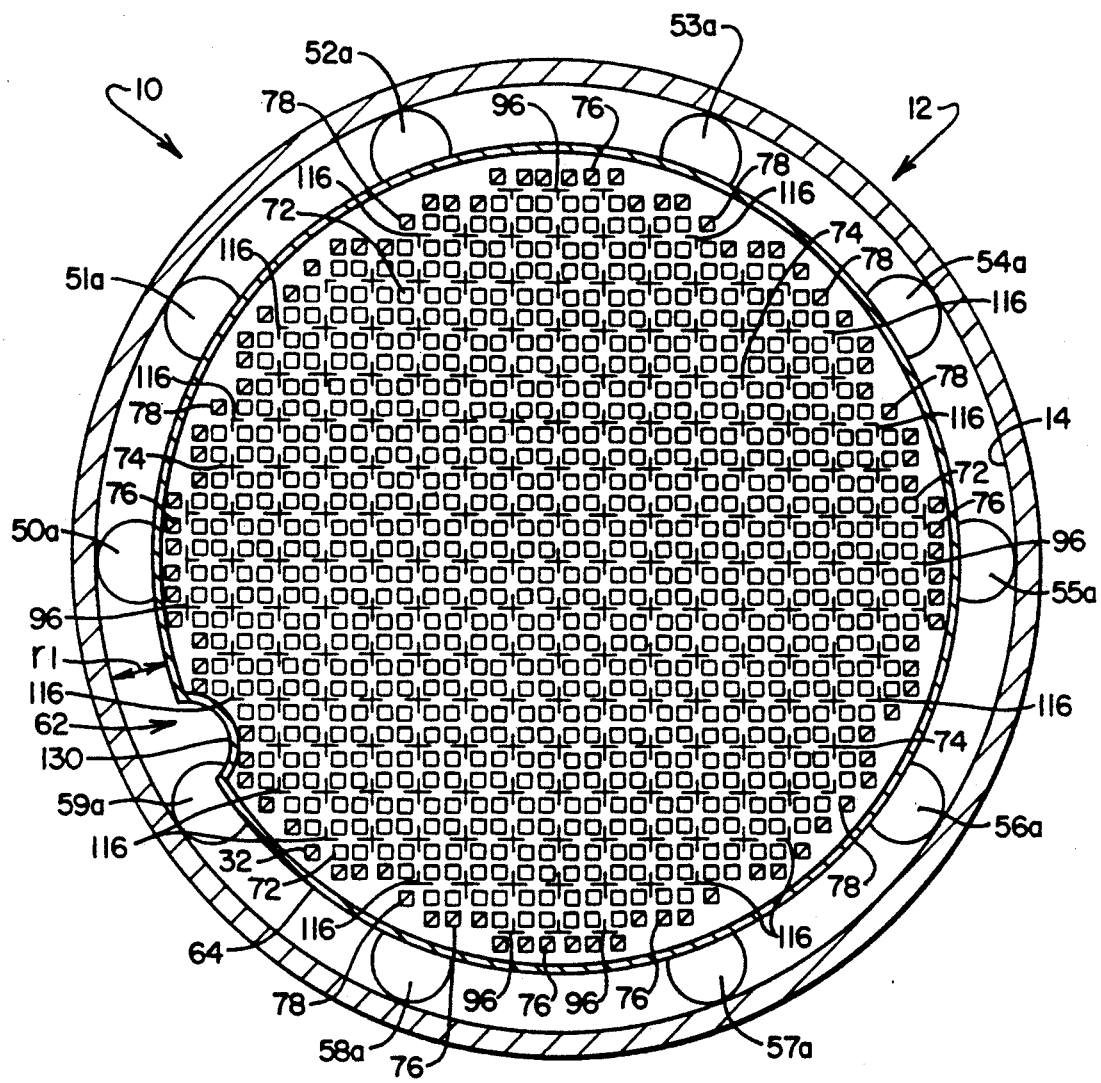
FIG. 2 is a sectional view of the reactor shown in FIG. 1, taken through the plane 2—2 shown therein.

Looking momentarily to FIG. 2, the head or impeller components of the array of pumps 50-59 are revealed at 50a-59a. It may be observed that the pumps 50-59 are within a circular pattern and are located in adjacency with the inner surface 14 of reactor vessel 12.

Returning to FIG. 1, a shroud 62 is seen to be positioned about the reactor core 32 and control rod guide assemblage 38. In the conventional ABWR design, the shroud structure is of uniform diametric extent throughout its length. However, in accordance with the present invention, shroud 62 is configured having a cylindrical core region portion 64 surrounding the core 32 which transitions in "scalloped" fashion at transition coupling 66 to a lower cylindrical portion 68 substantially surrounding the control rod guide assembly 38. With the arrangement thus shown, the diameter of the reactor core 32 is seen to be expanded such that its outer cylindrical periphery, now represented at the cylindrical core region portion 64 of shroud 62 is spaced from the inner surface of vessel 12 a distance r1 which, additionally, in conventional fashion, serves to define an annulus shaped core region coolant return. That coolant or fluid return extends downwardly, passing the transition coupling 66 to a broader return region as established by the outer periphery of control rod guide assembly 38, as now defined by the lower cylindrical portion 68 of shroud 62. At this level, the shroud or the control rod guide assemblage 38 periphery is spaced from inner surface 14 a distance r2. This larger spacing accommodates for the heads or impellers 50a-59a of the reactor internal pumps 50-59. As before, there thus is defined an annulus shaped pump region coolant return of larger volumetric extent. Finally, distinguishing the assembly 10 from earlier BWR designs, is a conically shaped skirt 70 employed to permit the use of the components 50-59.

Returning to FIG. 2, the expansion of the reactor core 32 such that the shroud portion 64 to inner surface 14 distance r2 is more than corresponding distance r1 stems from an evaluation of the neutron fluence or the integrated neutron dose over time at the periphery of the core. Neutrons at this peripheral region, in general are moderated by the hydrogen component of the cooling water fluid, such that the neutron dose experienced by the wall of reactor vessel 12 is low enough such that brittle fracture temperature phenomena are avoided. By adjusting the annulus radial size, r1, to the minimum value which will avoid neutron fluence induced vessel embrittlement, additional fuel assemblies may be used within the reactor core 32 to enhance power density for example by reducing the power density to achieve a desirable passive safety aspect while maintaining or, even increasing, the overall power output of the reactor.

The currently employed fuel assemblies, certain of which are represented at 72 in FIG. 2, are configured, for example, as an $8 \times 8$ array of fuel rods which, so combined, form a fuel bundle. This fuel bundle is enclosed by a fuel channel formed, for example, of a Zircoloy material of a square cross section. The fuel channels direct the core coolant flow through each fuel bundle and also serve to guide the control rods. Within the currently designed ABWR plants, the reactor cores employ a cruciform shaped fuel rod which may be withdrawn and retained within control rod guides located, for example at 38, which are tubular in structure. That form of cruciform control rod is retained in the instant reactor 10, however, only within the internal region of the core 32. Certain of these cruciform control rods are seen in FIG. 2, for example, at 74. Control rods 74, as in the past, perform in conjunction with the tubular control rod guide components.

Also seen within the core 32 are peripheral region fuel assemblies depicted symbolically in square cross-section with a slash, certain of them being identified at 76 being mutually aligned such that two oppositely disposed faces of the assemblies are in parallel with corresponding faces of other such assemblies. In other arrangements as at 78, the peripheral fuel assemblies are seen to be mutually diagonally aligned. In general, because of the lower neutron flux necessitated in the peripheral region due to diffusion of neutrons beyond the core boundaries of core 32, the fuel assemblies as at 76 and 78 are not as reactive. Very often, the peripheral fuel assemblies are moved in the course of fuel cycling from central reactor core regions to the core periphery in a progressive basis such that, at the periphery of the reactor core, they exhibit a somewhat expended fuel condition resulting in the further lowering of neutron flux or reactivity. Some control rod based control, however, is necessitated in the peripheral regions of the reactor 32. In view of the scalloped shape of the combination of reactor core 32 and control rod guide assembly 38 in conjunction with the lower portion of shroud 68, the implementation of control rod activity at the periphery then poses an interference problem. With the instant reactor assembly 10, this control requirement is accommodated for by the utilization of a control rod structure permitting the control and its associated guide to be mounted in somewhat close adjacency with the inner surface lower cylindrical portion 68 of shroud 62.

Figure 5A:
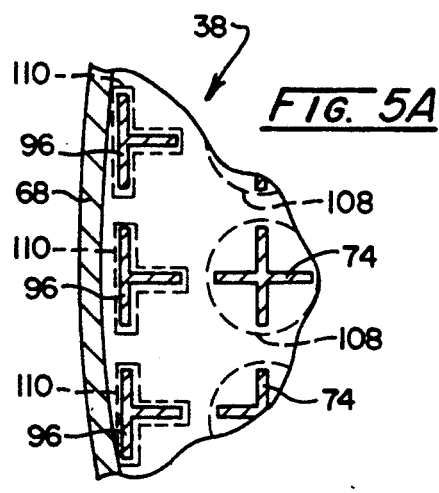
FIG. 5A is a partial sectional view taken through the plane 5—5 of FIG. 1 showing cruciform and T-shaped control rods and corresponding control guides.
Figure 3:
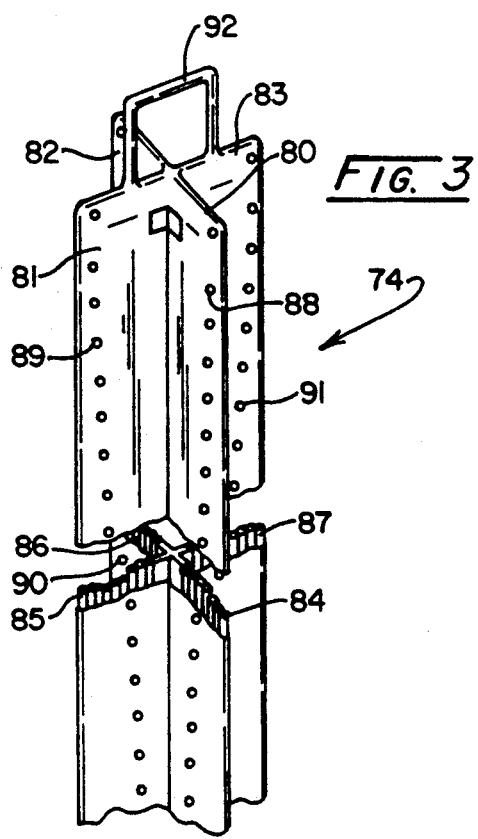
FIG. 3 is a partial perspective view of a cruciform form of control rod which may be employed with the reactor assembly of FIG. 1 having portions broken away to reveal internal structure.
Figure 4:
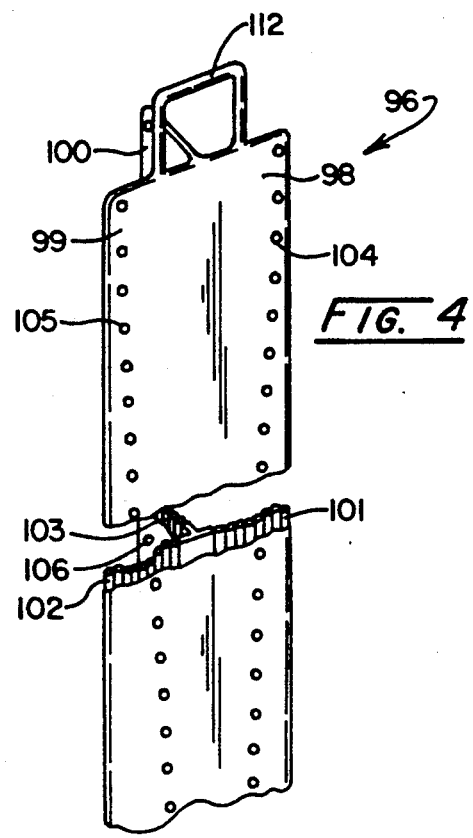
FIG. 4 is a partial perspective view of a T-shaped control rod which may be employed with the reactor of FIG. 1, having portions broken away to reveal internal structure.

Looking to FIG. 3, a general representation of a cruciform shaped control rod earlier described at 74 again is represented by that numeration. Control rod 74 is seen to be formed of four identically configured blades 80–83, each of which contains a plurality of compacted boron carbide powder filled stainless steel tubes shown, respectively, at 84–87. The rod 74 further may contain linear arrays of stainless steel rollers 88–91 to facilitate vertical movement. Finally, in typical fashion, a handle as at 92 is provided. Looking to FIG. 4, a variation of the cruciform control rod 74 is seen to be a three-blade T-shaped device represented generally at 96. T-shaped control rod 96 is seen in FIG. 2 to be employed in conjunction with the peripheral fuel assembly arrays 76 which have been described as having respective mutually oppositely disposed surfaces arranged in a linear array. The control rod 96 includes three blades 90–100 structured in similar fashion as the blades of control rod 74. In this regard, the blades are seen to be formed having a stainless-steel sheath which retains compacted boron carbide powder stainless steel tubes shown, respectively, at 101–103. Additionally, as before, linear arrays of rollers are positioned, respectively, at 104–106 at blades 98–100 and a handle 112 is provided at the top of the device. Turning to FIG. 5A, it may be seen that the cruciform control rods within the control rod guide assembly 38 are contained within tubular control rod guides as represented in phantom at 108. This form of guide support is conventional. However, in order to provide necessary reactor control while still accommodating for the larger diameter core performing in conjunction with the restricted peripheral diameter of assemblies 38, the T-shaped control rods 96 are seen to be supported by a correspondingly T-shaped control rod guide as represented in phantom at 110. Thus, the necessary proximity of the control rods 96 to the peripheral region of reactor core 32 is achieved.

Returning to FIG. 2, it may be observed that for the case of a mutual diagonal alignment of peripheral fuel assemblies as described at 78, an L-shaped control rod as at 116 may be employed.

Figure 6:
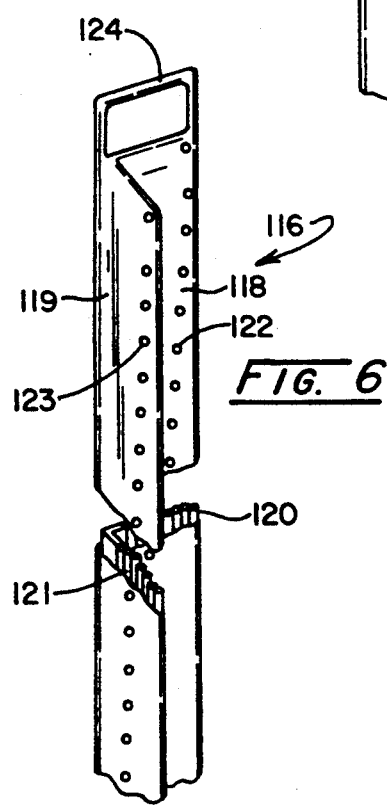
FIG. 6 is a partial perspective view of an L-shaped control rod employed with the reactor of FIG. 1 with portions broken away to reveal internal structure.

Looking to FIG. 6, L-shaped control rod 116 is shown at an enhanced level of detail. The control rod 116 is seen to include two blades 118 and 119 formed in similar fashion as cruciform control rod 74. These blades, as before, are configured as a stainless steel sheath which encloses, respectively, arrays of compacted boron carbide powder filled stainless steel tubes as shown, respectively, at 120 and 121. Additionally, linear arrays of rollers are provided within blades 118 and 119 as shown, respectively, at 122 and 123 and a handle 124 is provided at the top of the control rod device 116.

Figure 5B:
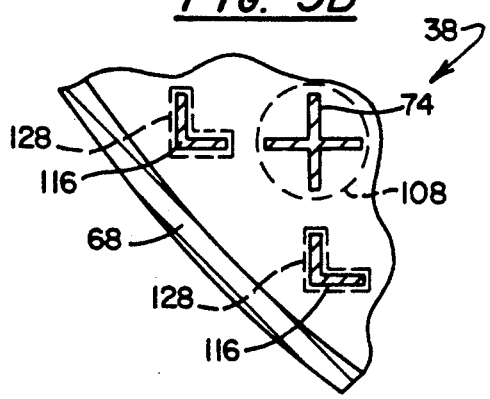
FIG. 5B is a partial sectional view taken through the plane 5—5 of FIG. 1 showing cruciform and L-shaped control rods along with control rod guides.

Looking to FIG. 5B, the L-shaped control rods 116 again are portrayed within the control rod assemblage 38. To stabilize these L-shaped control rods 116, a correspondingly L-shaped control rod guide shown in phantom 128 is provided.

Looking both to FIGS. 1 and 2, it may be observed that the shroud 62 at expanded core region 64 extends essentially over the upwardly facing surface of the impellers or head components 50a–59a of the recirculation pumps. These impeller components are removed from the top of reactor 10, thus an accommodation is made for the accessing of them from the upper region. FIG. 2 reveals that a semi-circular elongate notch 130 is provided within the cylindrical core region portion 64 of shroud 62 to provide for this access. Additionally, the impellers or heads 50a–59a may be provided slightly smaller, for example by an amount of about 10%, than those currently used with ABWR systems.

Considering the possibility for an expanded core diameter presented with the reactor assembly 10 as, for example, extending from 5.3 m to about 6.1 m, and, additionally, considering the requirements for neutron fluence and associated vessel embrittlement, observations may be made as to additional design options in terms of fuel rod active lengths (AFL) and power densities. These observations are summarized in Table I below in conjunction with FIG. 7. Core circumferential diameter is developed as a value represented the outer limit of a circumscribed circle about the individual fuel bundles.

Figure 7:
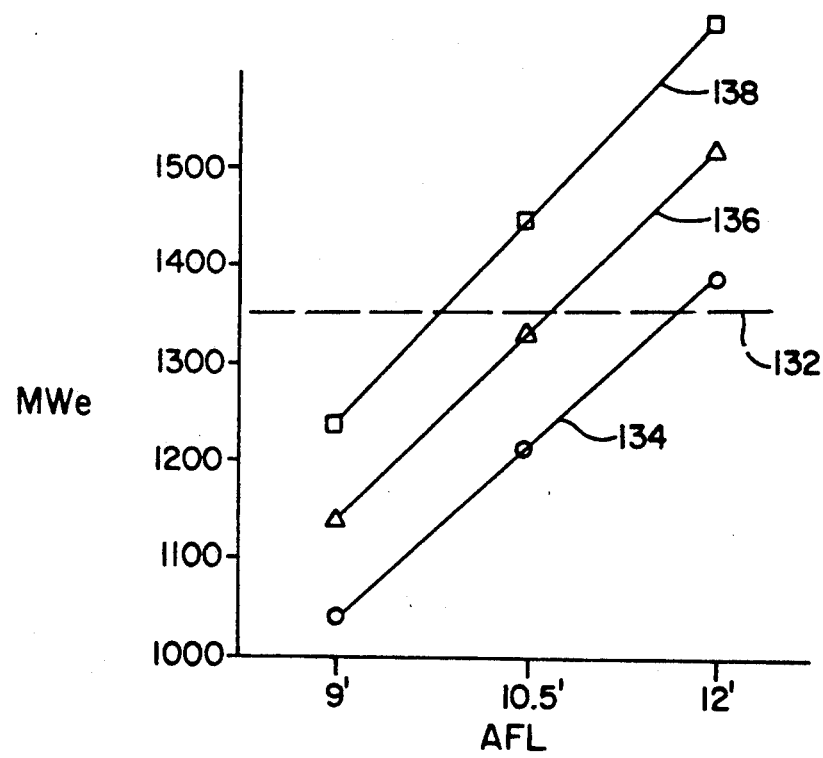
FIG. 7 is a graph showing power output versus active fuel length for three power densities as may be employed with the reactor of FIG. 1.

The current ABWR designs call for a power density of 50.5 KW/L to achieve an output of 1356 MWe which is represented by the dashed line level 132 in FIG. 7. Where the power density is lower, for example 42 KW/L, then a power output (MWe) with respect to active fuel length (AFL) may be represented by curve 134. Curve 134 shows that, for about a 9 foot AFL value, an output of slightly over 1,000 MWE can be realized. By lengthening the fuel rods, for example to a 10.5 foot AFT value, then that output value increases to slightly over 1200 MWe. At this lower point density, it may be observed that an output of 1392 MWe is achieved, a value greater than that with the current ABWR design. Where the power density is increased to 46 KW/L, then the relationships represented at curve 136, is obtained. Note that the current power output of 1356 MWe is almost achieved with an AFL value of 10.5 feet. Next, essentially the presently envisioned power density of 50 KW/L is plotted in conjunction with curve 138. Curve 138 shows that the current output of the ABWR is achieved with an AFL between 9 feet and 10.5 feet. Additionally, by increasing the AFL values, substantial increases in electrical output MWe are realized. Of particular interest in the subject matter of Table I and curve 136 is that a substantial equivalent power output can be achieved with the invention with a lower power density of 46 KW/L and a smaller active fuel length (AFL) of about 10.5 feet. Thus, system stability can be improved and the all pump trip case can be minimized with the instant design.

TABLE I

| KW/L | AFL | MWth | MWe |
|---|---|---|---|
| 42 | 9' | 3131 | 1043 |
| 42 | 10.5' | 3653 | 1218 |
| 42 | 12' | 4175 | 1392 |
| 46 | 9' | 3429 | 1143 |
| 46 | 10.5' | 4001 | 1334 |
| 46 | 12' | 4572 | 1524 |

TABLE I-continued

| KW/L | AFL | MWth | MWe |
|------|-------|------|------|
| 50 | 9' | 3727 | 1242 |
| 50 | 10.5' | 4349 | 1450 |
| 50 | 12' | 4970 | 1657 |

7.1 m. RPV inner diameter
6.1 m Core circumferential diameter

Since certain changes may be made in the above-described apparatus without departing from the scope of the invention herein involved, it is intended that all matter contained in the description thereof or shown in the accompanying drawings shall be interpreted as illustrative and not in a limiting sense.

I claim:

1. A power reactor comprising:
an upstanding reactor vessel having an internal surface of generally cylindrical configuration and of predetermined inner diameter;
steam treating means within a generally upwardly disposed region of said vessel for providing steam-water separation;
a plurality of coolant recirculation pumps having impellers mounted within a lower portion of said reactor vessel within an annulus shaped region adjacent said vessel internal surface;
a reactor core exhibiting a predetermined core circumferential diameter located within said vessel, including a predetermined number of internally and peripherally disposed fuel assemblies incorporating fuel rods of predetermined active fuel length and power density;
a control rod guide assemblage including a plurality of control rod guides positioned within said vessel adjacent said reactor core and inwardly of said annulus shaped region;
a plurality of control rods, each movable from within a said control rod guide to a select location intermediate adjacent said fuel assemblies;
a shroud positioned within said reactor vessel, having a cylindrical core region portion located to extend at least partially over said annulus shaped region, surrounding said reactor core and spaced with said core from said vessel internal surface a substantially minimum distance avoiding neutron fluence induced vessel embrittlement and providing a core region coolant return; and
drive means coupled with said control rods for effecting said movement thereof.

2. The power reactor of claim 1 in which said shroud cylindrical core region transitions to a lower, cylindrical portion substantially surrounding said control rod guide assemblage and located inwardly of said annulus shaped region.

3. The power reactor of claim 2 in which:
said reactor vessel predetermined inner diameter is about 7.1 meters; and
said core circumferential diameter is about 6.1 meters.

4. The power reactor of claim 3 in which said fuel rod predetermined active lengths is from about 2.75 to less than about 3.81 meters.

5. A power reactor, comprising:
an upstanding reactor vessel having an internal surface of generally cylindrical configuration and of predetermined diameter;
steam treating means situate within a generally upwardly disposed region of said vessel for providing steam-water separation;
a reactor core located within said vessel below said steam treating means, extending a predetermined distance between a top and bottom, including a matrix of a predetermined number of mutually spaced, vertically oriented fuel assemblies, said matrix having outwardly positioned peripheral fuel assemblies located within a generally cylindrical core periphery of predetermined diameter, said core periphery being spaced from said vessel inner surface a select first distance to define an annular shaped core region coolant return;
a plurality of coolant recirculation pumps having head portions mounted within said vessel below said core and disposed in a circular pattern adjacent said vessel inner surface;
a control rod guide assemblage including a plurality of control rod guides located within said vessel adjacent said core bottom and extending between substantially peripherally disposed control rod guides to define a generally cylindrically shaped guide region extending inwardly from said circular pattern of recirculation pumps and spaced from said vessel inner surface a second distance greater than said first distance to define an annulus shaped pump region coolant return;
a plurality of control rods, each movable from within a said control rod guide to a select location intermediately adjacent said fuel assemblies; and
drive means coupled with said control rods for effecting said movement thereof.

6. The power reactor of claim 5 in which said peripherally disposed control rod guides are located for the movement of an associated said control rod to a location adjacent to and inwardly disposed from a said peripheral fuel assembly.

7. The power reactor of claim 5 including a shroud positioned within said reactor, having a cylindrical core region portion surrounding said reactor core at said cylindrical core periphery and spaced from said vessel inner surface to substantially define said first distance, and transitioning to a lower cylindrical portion substantially surrounding said control rod guide assemblage, positioned inwardly from said recirculation pumps and spaced from said vessel inner surface to substantially define said second distance.

8. The power reactor of claim 7 in which said shroud cylindrical core region portion includes a vertically disposed inwardly depending notch configured for accessing said coolant recirculation pumps head portion from an upwardly disposed region of said reactor vessel.

9. The power reactor of claim 5 in which said fuel assemblies have an active fuel length of from about 2.75 to less than about 3.81 meters.

10. The power reactor of claim 5 in which:
said reactor vessel predetermined inner diameter is about 7.1 meters; and
said core periphery predetermined diameter is about 6.1 meters.

11. The power reactor of claim 5 in which said first distance is selected to provide a substantially minimum distance avoiding neutron fluence induced vessel embrittlement.

12. A power reactor, comprising:

an upstanding reactor vessel having an internal surface of generally cylindrical configuration and of inner diameter of about 7.1 meters;

steam treating means within a generally upwardly disposed region of said vessel for providing steam-water separation;

a plurality of coolant recirculation pumps having impellers of given diametric extent mounted within a lower portion of said reactor vessel within an annulus shaped region of radial extent corresponding with said given diametric extent and adjacent said vessel internal surface;

a reactor core having a core circumferential diameter of about 6.1 meters, located within said vessel, including a predetermined number of internally and peripherally disposed fuel assemblies;

a control rod guide assemblage including a plurality of control rod guides positioned within said vessel adjacent said reactor core and inwardly of said annulus shaped region; and drive means coupled with said control rods for effecting said movement thereof.

13. A power reactor comprising:

an upstanding reactor vessel having an internal surface of generally cylindrical configuration and of predetermined inner diameter;

steam treating means within a generally upwardly disposed region of said vessel for providing steam-water separation;

a plurality of coolant recirculation pumps having impellers mounted within a lower portion of said reactor vessel within an annulus shaped region adjacent said vessel internal surface;

a reactor core exhibiting a predetermined core circumferential diameter located within said vessel, including a predetermined number of internally and peripherally disposed fuel assemblies incorporating fuel rods of predetermined active fuel length and power density;

a control rod guide assemblage including a plurality of control rod guides positioned within said vessel adjacent said reactor core and inwardly of said annulus shaped region;

a plurality of control rods, each movable from within a said control rod guide to a select location intermediate adjacent said fuel assemblies and including select said control rods movable into adjacency with said peripherally disposed fuel assemblies and configured having three blade portions in the form of a "T" wherein two said blade portions are in parallel alignment;

a shroud positioned within said reactor vessel, having a cylindrical core region portion located over said annulus shaped region, surrounding said reactor core and spaced with said core from said vessel internal surface a substantially minimum distance avoiding neutron fluence induced vessel embrittlement and providing a core region coolant return; and drive means coupled with said control rods for effecting said movement thereof.

14. The power reactor of claim 13 in which said control rods are located by said control rod guides for movement into adjacency with two select said peripheral fuel assemblies arranged within said reactor core in a manner wherein two oppositely disposed surfaces of one said select peripheral fuel assembly are in parallel relationship with two oppositely disposed surfaces of the other said select peripheral fuel assembly.

15. A power reactor comprising:

an upstanding reactor vessel having an internal surface of generally cylindrical configuration and of predetermined inner diameter;

steam treating means within a generally upwardly disposed region of said vessel for providing steam-water separation;

a plurality of coolant recirculation pumps having impellers mounted within a lower portion of said reactor vessel within an annulus shaped region adjacent said vessel internal surface;

a reactor core exhibiting a predetermined core circumferential diameter located within said vessel, including a predetermined number of internally and peripherally disposed fuel assemblies incorporating fuel rods of predetermined active fuel length and power density;

a control rod guide assemblage including a plurality of control rod guides positioned within said vessel adjacent said reactor core and inwardly of said annulus shaped region;

a plurality of control rods, each movable from within a said control rod guide to a select location intermediate adjacent said fuel assemblies and including first said control rods movable into adjacency with said peripherally disposed fuel assemblies configured having two blade portions in the form of an "L" wherein two said blade potions are in parallel alignment;

a shroud positioned within said reactor vessel, having a cylindrical core region portion located over said annulus shaped region, surrounding said reactor core and spaced with said core from said vessel internal surface a substantially minimum distance avoiding neutron fluence induced vessel embrittlement and providing a core region coolant return; and drive means coupled with said control rods for effecting said movement thereof.

16. The power reactor of claim 15 in which said second control rods are located by said control rod guides for movement into adjacency with two select said peripheral fuel assemblies arranged within said reactor core in a manner wherein the diagonal extents thereof are in mutually parallel relationship.

17. The power reactor of claim 15 in which first said control rods are movable by said drive means into adjacency with said peripherally disposed fuel assemblies and are configured having three blade portions in the form of a "T" wherein two said blade portions are in parallel alignment.

18. A power reactor, comprising:

an upstanding reactor vessel having an internal surface of generally cylindrical configuration and of predetermined diameter;

steam treating means situate within a generally upwardly disposed region of said vessel for providing steam-water separation;

a reactor core located within said vessel below said steam treating means, extending a predetermined distance between a top and bottom, including a matrix of a predetermined number of mutually spaced, vertically oriented fuel assemblies, said matrix having outwardly positioned peripheral fuel assemblies located within a generally cylindrical core periphery of predetermined diameter, said core periphery being spaced from said vessel inner surface a select first distance to define an annular shaped core region coolant return;

a plurality of coolant recirculation pumps having head portions mounted within said vessel below said core and disposed in a circular pattern adjacent said vessel inner surface;

a control rod guide assemblage including a plurality of control rod guides located within said vessel adjacent said core bottom and extending between substantially peripherally disposed control rod guides to define a generally cylindrically shaped guide region extending inwardly from said circular pattern of recirculation pumps and spaced from said vessel inner surface a second distance greater than said first distance to define an annulus shaped pump region coolant return;

a plurality of control rods, each movable from within a said control rod guide to a select location intermediately adjacent said fuel assemblies and including select said control rods within said peripherally disposed control rod guides configured having a T-shaped cross-section; and drive means coupled with said control rods for effecting said movement thereof.

19. The power reactor of claim 18 in which said peripherally disposed control guides from within which said select T-shaped control rods are moved and configured having a T-shaped cross-section.

20. A power reactor, comprising:

an upstanding reactor vessel having an internal surface of generally cylindrical configuration and of predetermined diameter;

steam treating means situate within a generally upwardly disposed region of said vessel for providing steam-water separation;

a reactor core located within said vessel below said steam treating means, extending a predetermined distance between a top and bottom, including a matrix of a predetermined number of mutually spaced, vertically oriented fuel assemblies, said matrix having outwardly positioned peripheral fuel assemblies located within a generally cylindrical core periphery of predetermined diameter, said core periphery being spaced from said vessel inner surface a select first distance to define an annular shaped core region coolant return;

a plurality of coolant recirculation pumps having head portions mounted within said vessel below said core and disposed in a circular pattern adjacent said vessel inner surface;

a control rod guide assemblage including a plurality of control rod guides located within said vessel adjacent said core bottom and extending between substantially peripherally disposed control rod guides to define a generally cylindrically shaped guide region extending inwardly from said circular pattern of recirculation pumps and spaced from said vessel inner surface a second distance greater than said first distance to define an annulus shaped pump region coolant return;

a plurality of control rods, each movable from within a said control rod guide to a select location intermediately adjacent said fuel assemblies and including select said control rods within said peripherally disposed control rod guides configured having an L-shaped cross-section; and drive means coupled with said control rods for effecting said movement thereof.

21. The power reactor of claim 20 in which said peripherally disposed control rod guides from within which said select L-shaped control rods are moved are configured having an L-shaped cross-section.

22. A power reactor, comprising:

an upstanding reactor vessel having an internal surface of generally cylindrical configuration and of inner diameter of about 7.1 meters;

steam treating means within a generally upwardly disposed region of said vessel for providing steam-water separation;

a plurality of coolant recirculation pumps having impellers of given diametric extent mounted within a lower portion of said reactor vessel within an annulus shaped region of radial extent corresponding with said given diametric extent and adjacent said vessel internal surface;

a reactor core having a core circumferential diameter of about 6.1 meters, located within said vessel, including a predetermined number of internally and peripherally disposed fuel assemblies;

a control rod guide assemblage including a plurality of control rod guides positioned within said vessel adjacent said reactor core and inwardly of said annulus shaped region;

a plurality of control rods, each movable from within a said control rod guide to a select location intermediately adjacent said fuel assemblies and including select said control rods movable into adjacency with said peripherally disposed fuel assemblies configured having three blade portions in the form of a "T" wherein two said blades portions are in parallel alignment; and drive means coupled with said control rods for effecting said movement thereof.

23. A power reactor, comprising:

an upstanding reactor vessel having an internal surface of generally cylindrical configuration and of inner diameter of about 7.1 meters;

steam treating means within a generally upwardly disposed region of said vessel for providing steam-water separation;

a plurality of coolant recirculation pumps having impellers of given diametric extent mounted within a lower portion of said reactor vessel within an annulus shaped region of radial extent corresponding with said given diametric extent and adjacent said vessel internal surface;

a reactor core having a core circumferential diameter of about 6.1 meters, located within said vessel, including a predetermined number of internally and peripherally disposed fuel assemblies;

a control rod guide assemblage including a plurality of control rod guides positioned within said vessel adjacent said reactor core and inwardly of said annulus shaped region;

a plurality of control rods, each movable from within a said control rod guide to a select location intermediately adjacent said fuel assemblies and including select said control rods movable into adjacency with said peripherally disposed fuel assemblies configured having three blade portions in the form of a "L"; and drive means coupled with said control rods for effecting said movement thereof.

24. A power reactor, comprising:

an upstanding reactor vessel having an internal surface of generally cylindrical configuration and a predetermined inner diameter;

steam treating means within a generally upwardly disposed region of said vessel for providing steam-water separation;

a reactor core having a predetermined core circumferential diameter located within said vessel, including a predetermined number of internally and peripherally disposed fuel assemblies;

a control rod guide assemblage including a plurality of control rod guides positioned within said vessel adjacent said reactor core;

a plurality of control rods, each movable from within a said control rod guide to a select location intermediately adjacent said fuel assemblies and including select said control rods movable into adjacency with said peripherally disposed fuel assemblies configured having three blade portions in the form of a "T" wherein two said blades portions are in parallel alignment; and drive means coupled with said control rods for effecting said movement thereof.

25. The power reactor of claim 24 in which said control rod guides from within which said select control rods are movable into adjacency with said peripherally disposed fuel assemblies are configured having an T-shaped cross-section.

26. A power reactor, comprising:

an upstanding reactor vessel having an internal surface of generally cylindrical configuration and a predetermined inner diameter;

steam treating means within a generally upwardly disposed region of said vessel for providing steam-water separation;

a reactor core having a predetermined core circumferential diameter located within said vessel, including a predetermined number of internally and peripherally disposed fuel assemblies;

a control rod guide assemblage including a plurality of control rod guides positioned within said vessel adjacent said reactor core;

a plurality of control rods, each movable from within a said control rod guide to a select location intermediately adjacent said fuel assemblies and including select said control rods movable into adjacency with said peripherally disposed fuel assemblies configured having two blade portions in the form of an "L"; and drive means coupled with said control rods for effecting said movement thereof.

27. The power reactor of claim 26 in which said control rod guides from within which said select control rods are movable into adjacency with said peripherally disposed fuel assemblies are configured having an L-shaped cross-section.

* * * * *